insoluble polymers which are insoluble in all solvents. This reaction may be illustrated as follows:

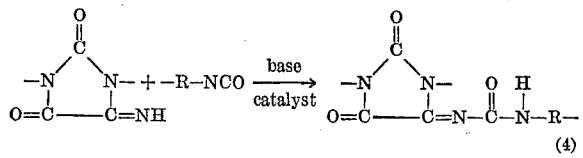

(4)

The isocyanate group (—R—NCO) may be on an unreacted diisocyanate or an end group on a polymer chain or any intermediate in the formation of a polymer chain. Because of the possibility of this cross-linking reaction when base catalysts are present, the initiation and propagation is preferably carried out in the presence of a cyanide ion. However, the cross-linking reaction may be limited or eliminated by controlling the reaction temperature, the reaction time and the specific base catalyst used. Accordingly, it is possible to obtain the soluble polymers of the present invention by proper control of conditions when a base catalyst such as tertiary nitrogen compounds which have no active hydrogen atoms, phosphorous compounds such as triphenyl phosphine, tin compounds such as dibutyl tin dilaurate, dibutyl ten diacetate, and lead compounds such as trimethyl plumbyl acetate are employed.

Before precipitating the polymer, it may be treated with a reactive compound such as an alcohol, secondary amine, or primary amine to react with the isocyanate end groups. This effectively eliminates the isocyanate groups so that cross-linking by their reaction with the imino groups of the heterocyclic rings does not occur.

The product is then precipitated by pouring the reaction solution into a reactive solvent such as methanol, ethanol, propanol, dilute ammonium hydroxide, primary and secondary amines, or water, or into a nonreactive solvent such as benzene, toluene or acetone. The reactive solvent will react with the terminal isocyanate groups to form carbamates, ureas, or amines which will prevent further reaction and undesirable side reactions. A more stable polymer is produced when it is precipitated in a reactive solvent.

The polymers produced according to the present invention, whether treated with a reactive solvent before precipitating the polymer or precipitated in a solvent that will react with the terminal isocyanate groups or in one which will not react therewith are soluble and can be redissolved in dipolar aprotic solvents. This clearly indicates that there is no cross-linking in the polymers so produced. There is evidence that where the terminal isocyanate group is not reacted with a reactive solvent that cross-linking may occur upon standing or heating for any considerable length of time.

Thus, it is preferred to treat the polymers with a reactive solvent which reacts with the terminal isocyanate groups so that a stable polymer which will remain soluble can be obtained.

The following examples illustrate the production of the soluble heterocyclic polymer of the present invention and are intended to illustrate and not limit the scope of the present invention.

EXAMPLE 1

A stream of dry hydrogen cyanide was slowly bubbled through a cold (6° C.) solution of 50.4 gms. (0.2 mole) of 4,4'-diphenylmethane diisocyanate in 100 ml. of pyridine in a nitrogen atmosphere. The temperature was controlled between 6° and 10° C. The addition of 0.25 mole (0.05 mole excess) of hydrogen cyanide required 81 minutes, and at this point the reaction solution was very viscous. Methyl alcohol (5 mls.) was then added. The clear reaction solution was poured into petroleum ether and toluene in a Waring blender to form a finely divided yellow powder. The yield was 56 gms. (quantitative). The infrared spectrum did not reveal the presence of an isocyanate group, thus implying either that the molecular weight was very high and/or that considerable cross-linking occurred. The insolubility of the product in chloroform, acetone, methylethylketone, isopropanol, tetrahydrofuran, ethyl acetate, formic acid, chlorobenzene, o-dichlorobenzene, m-cresol, pyridine, dimethylforamide (swelling), hexamethylphosphormide (swelling) and dimethylsulfoxide (swelling) indicated that the product was cross-linked.

The foregoing example illustrates that in the reaction of hydrogen cyanide and a diisocyanate using a base such as pyridine that a cross-linked polymer may be produced. The cross-linked polymers are insoluble in all solvents and are swelled by a few solvents. The cross-linking may occur through the imino hydrogen of the imidazolidine ring.

In contrast to the cross-linked polymer formed in Example 1, the soluble or non-crosslinked polymers of the present invention are illustrated in the following examples.

EXAMPLE 2

Hydrogen cyanide was bubbled through a solution of 20 gms. of diphenylmethane diisocyanate, 0.05 gm. sodium cyanide, and 192 gms. of N-methylpyrrolidone. No attempt was made to control the temperature which spontaneously rose from room temperature to 64° C. After 30 minutes the reaction solution was cooled to room temperature. Since the quantity of hydrogen cyanide bubbled through the solution was not measured, no material balance was possible.

Part of the solution was poured into toluene to precipitate 5 gms. of product A. The remainder of the reaction solution was poured into water to precipitate 9 gms (product B) which had an inherent viscosity of 0.75.

Both products A and B were soluble in dimethylformamide and in N-methylpyrrolidone when they had just been made; however, after one week product A was insoluble in both solvents. This indicated that the product had cross-linked. Cross-linking probably occurred by reaction of the unreacted isocyanate end groups with the imino groups on the heterocyclic rings. The solubility of product B did not change with time; here the residual isocyanate groups on the polymer had been hydrolyzed to amino groups during the precipitation in water and a cross-linking reaction could not occur.

It was concluded from this data that the cyanide ion effectively catalyzed the formation of the desired heterocyclic polymer in the polymerization process by the "one-shot" technique. Clear tough films were cast from solutions of products A and B.

All inherent viscosities given in all examples were measured at 0.5 gm. polymer per 100 ml. of dimethylformamide at 25° C. Intrinsic viscosities as set forth in the examples were measured in dimethylformamide at 25° C.

EXAMPLE 3

A solution of 110 gms. of diphenylmethane diisocyanate in 250 gms. of N-methylpyrrolidone and a solution of 12 gms. of hydrogen cyanide in 165 gms. of N-methylpyrrolidone were placed in separate addition funnels mounted on a Y-shaped adapter so that when they were added they were mixed just prior to contact with the catalyst solution. The catalyst solution was prepared by adding 5 ml. of a saturated solution of sodium cyanide in N-methylpyrrolidone to 200 gms. of the same solvent.

The reaction temperature was controlled at 40° C. The additions required 45 minutes. Ten minutes after the additions were complete part of the viscous solution was poured into toluene to precipitate 15 gms. of product A which had an inherent viscosity of 1. The remainder of the solution was precipitated in water to give a colorless polymer, product B, having an inherent viscosity of 0.70.

The products were apparently not completely cyclized, because during hydrolysis of product B the molecular weight decreased so that the inherent viscosity was 0.12.

The first product (A) was redissolved in dimethylformamide and treated with triethylamine for 10 minutes to eliminate the factors responsible for polymer degradation during hydrolysis. After precipitation in toluene, it (product C) had an inherent viscosity of 1 (unchanged) which was the same as when it was initially precipitated. A portion of C was then hydrolyzed, and the product had an inherent viscosity of 0.80.

Although polymers are formed by cyanide ion catalyst alone, treatment of the polymer product with a tertiary amine, stabilized the polymer so that degradation did not occur during hydrolysis.

The foregoing example illustrates a preferred addition of the reactants. The following examples illustrate various modifications which can be made to produce polymers of the present invention.

EXAMPLE 4

A solution of 53 gms. of hydrogen cyanide in 184 ml. of N-methylpyrrolidone and a solution of 490 gms. of 4,4'-diphenylmethane diisocyanate in 1000 ml. of N-methylpyrrolidone were added dropwise and simultaneously to a solution of 6000 ml. of N-methylpyrrolidone which contained 25 ml. of a saturated solution of sodium cyanide in the same solvent. The addition required 7 minutes. The temperature rose to 45° C. and the solution became viscous. Thirty minutes after the addition was complete 20 gms. of triethylamine was added to the reaction solution; no temperature rise was noted. After stirring an additional thirty minutes, 30 ml. of anhydrous methanol were added to react with the unreacted isocyanate groups. The product was then precipitated in toluene. The dry white powder weighed 532 gms. (98% yield). It had an intrinsic viscosity of 1.14. Thermographimetric analysis showed that the dry material underwent 5% weight loss at 362° C. A film cast from dimethylformamide had a tensile strength of 14,750 p.s.i. and a 1% secant modulus of 404,000 p.s.i. The soluble polymer formed had a structure in which there was a random distribution of repeating units as follows:

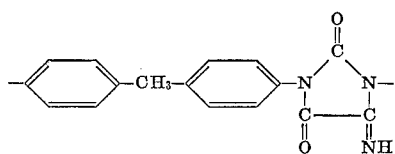

or

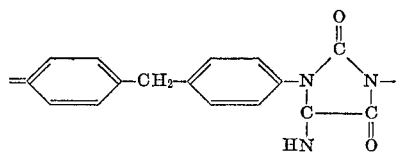

EXAMPLE 5

A solution of 65 gms. of hydrogen cyanide in 150 ml. of N-methylpyrrolidone and a solution of 606.9 gms. of 4,4'-diphenylether diisocyanate in 1000 ml. of N-methylpyrrolidone were added simultaneously to a solution of 3000 ml. of N-methylpyrrolidone containing 25 ml. of the same solvent saturated with sodium cyanide. The addition required 7 minutes, after which an additional 4500 ml. of solvent was added to the very viscous reaction solution. Triethylamine (24 gms.) in 75 ml. of N-methylpyrrolidone was added to the polymer solution 105 minutes after the addition of reagents was complete, and 37 minutes later the polymer was precipitated in methanol. It was filtered and washed with methanol. After drying, the pale yellow product weighed 670 gms. (quanitative yield). The polymer had an inherent viscosity of 1.25. The soluble polymer formed had a structure in which there was a random distribution of repeating units as follows:

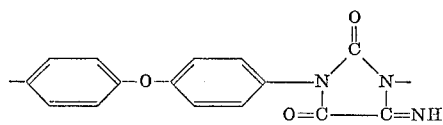

or

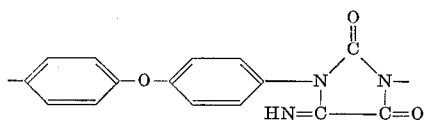

*Analysis.*—Calculated for $(C_{15}H_9N_3O_3)_n$ (percent): C, 64.52; H, 3.25; N, 15.04. Found (percent): C, 64.32; H, 3.10; N, 14.81.

The polymer exhibited good oxidative stability at 200° C. Films cast from dimethylformamide solution had a tensile strength of 13,000 p.s.i.

EXAMPLE 6

The polymer prepared in this example is made from a mixture of 80 mole percent 4,4'-diphenylmethane diisocyanate and 20 mole percent of hexamethylene diisocyanate. A solution of 65 gms. of hydrogen cyanide and 80.7 gms. of hexamethylene diisocyanate in 146 ml. of N-methylpyrrolidone and a solution of 480 gms. of 4,4'-phenylmethane diisocyanate in 1000 ml. of N-methylpyrrolidone were added simultaneously to 4000 ml. of N-methylpyrrolidone containing 25 ml. of the same solvent which had been saturated with sodium cyanide. The addition required 6 minutes and the exothermic reaction raised the temperature from 24° C. to 55° C. Additional (1000 ml.) solvent was added to dilute the viscous reaction solution. Later, 24.2 gms. of triethylamine in 75 ml. of N-methylpyrrolidone was added. An additional 48.4 gms. of triethylamine was added to the reaction solution. Methanol was added to the reaction solution and the product was precipitated in water. The product was filtered, washed with water, and finally washed with methyl alcohol. The yield of dry product was 97% of theoretical. It has an inherent viscostiy of 0.32. The polymer formed had a structure in which there was a random distribution of repeating units (1 or 2) but present (as to A and B) in the mole ratio 4:1 A to B as follows:

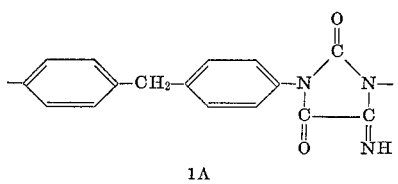

1A

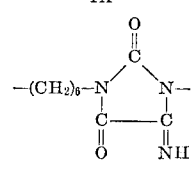

1B

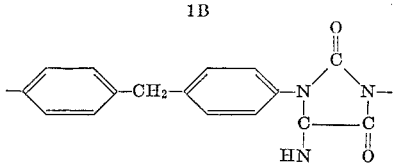

2A

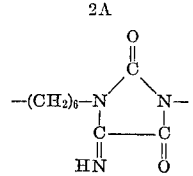

2B

United States Patent Office 3,547,897
Patented Dec. 15, 1970

3,547,897
SOLUBLE POLY(IMINOIMIDAZOLIDINEDIONES)
Tad L. Patton, Baytown, Tex., assignor to Esso Research and Engineering Company
No Drawing. Continuation-in-part of application Ser. No. 685,311, Nov. 24, 1967. This application Feb. 3, 1969, Ser. No. 796,143
Int. Cl. C08g 22/02
U.S. Cl. 260—77.5
10 Claims

ABSTRACT OF THE DISCLOSURE

Heterocyclic polymers characterized by 2,4,5-trisubstituted 1,3-imidazolidine-1,3-diyl rings and soluble in dipolar aprotic solvents are produced by the reaction of diisocyanates with hydrogen cyanide in the presence of an added cyanide ion. These heterocyclic polymers have a structure of alternating organic moieties and substituted 1,3-imidazolidine-1,3-diyl rings, said imidazolidine rings being predominantly a mixture of 4-imino-1,3-imidazolidine-2,5 - dione-1,3-diyl and 5-imino-1,3-imidazolidine-2,4-dione-1,3-diyl rings which are randomly distributed in their sequence.

CROSS REFERENCE TO RELATED APPLICATIONS

This is a continuation-in-part application of Ser. No. 685,311 filed Nov. 24, 1967, entitled, "Heterocyclic Polymers."

BACKGROUND OF THE INVENTION

Field of the invention

The present invention is directed to soluble heterocyclic polymers. These soluble heterocyclic polymers of the present invention have a structure of alternating organic moieties and substituted 1,3-imidazolidine-1,3-diyl rings, said imidazolidine rings being predominantly imidazolidine rings which are a mixture of 4-imino-1,3-imidazolidine-2,5-dione-1,3-diyl and 5-imino-1,3-imidazolidine-2,4-dione-1,3-diyl rings which are randomly distributed in their sequence.

Description of the prior art

The reaction of monoisocyanates with hydrogen cyanide is known as disclosed by W. Dieckmann et al., Berichte 38, 2977 (1905). It has been disclosed by S. Petersen in Annalen der Chemie 562, 205–226 (1949) that hexamethylene dicyanoformamide is formed by the reaction of hydrogen cyanide with hexamethylene diisocyanate. There is no disclosure, however, of the formation of useful polymers having the characteristics of the repeating units containing the imidazolidine ring as set forth above and being useful in the formation of films, fibers, foams and molded objects.

An article in Die Macromolekulare Chemie 78, 186 (1964) by Akira Oku, Masaya Okano and Ryohei Oda discloses:

"Starting from diisocyanates and hydrogen cyanide poly(5-iminohydantoins) have been prepared by the following two methods.

(1) Polyaddition between a diisocyanate and a di(carbamoyl cyanide), which corresponds to a 1:2 diisocyanate-hydrogen cyanide adduct.

(2) Hydrogen cyanide-eleminating polymerization (polycondensation) of a di(carbamoyl cyanide). The former method generally gave more satisfactory results."

SUMMARY OF THE INVENTION

The heterocyclic polymers of the present invention may be prepared by the reaction of hydrogen cyanide with a diisocyanate or mixture of diisocyanates in the presence of an alkali metal cyanide. The alkali metal cyanides are exemplified by sodium cyanide and potassium cyanide. The reaction when carried out in the presence of these alkali metal cyanides produces the soluble polymers of the present invention. These soluble heterocyclic polymers are characterized by three well-defined absorption bands at 5.52–5.60, 5.70–5.78 and 5.92–6.0 microns in their infrared spectra. The soluble polymers differ from the cross-linked polymers which may be formed by the reaction of hydrogen cyanide with diisocyanates in the presence of a base such as a tertiary amine. Polymers formed by the reaction of hydrogen cyanide with a diisocyanate in the presence of an amine catalyst are generally insoluble in all solvents. These polymers which are insoluble further show swelling in dipolar aprotic solvents and are infusible below the decomposition temperature. The foregoing properties indicate that cross-linking occurred. This cross-linking is most likely to occur by the base catalyzed reaction of some of the imino groups in the heterocyclic rings with isocyanate groups. The isocyanate group may be an isocyanate end-group on a polymer chain or one of the isocyanate groups on unreacted diisocyanate monomer. When cross-linking occurs by the reaction described above, some of the imino hydrogens will be replaced by carbamoyl groups.

Any of a number of procedures may be used to prepare polymers by the reaction of hydrogen cyanide with a diisocyanate in the presence of an alkali metal cyanide; however, a procedure which may be preferred is one wherein a solution of hydrogen cyanide and a solution of diisocyanate is added to a solution of the metal cyanide catalyst. By this procedure the concentration of unreacted hydrogen cyanide and unreacted diisocyanate in the reaction solution may be easily controlled.

DESCRIPTION OF THE PREFERRED EMBODIMENTS

The diisocyanates which may be used in the reaction with hydrogen cyanide in the presence of added cyanides are characterized by the formula:

OCN—R—NCO where: R is the organic moiety of the diisocyanate which may be aliphatic, alicyclic, aromatic, or mixtures thereof and functionally substituted derivatives thereof provided  the functional group does not react with an isocyanate group.

Thus, the diisocyanates may be selected from a broad group having a large variety of organic moieties. The organic moieties of the diisocyanates may be substituted with groups such as sulfoxy, sulfonyl, alkoxy, aryloxy, oxy, ester, alkylthio, arylthio, nitro, halogen, alkyl, aryl and the like which do not react with the isocyanate group. Functional groups which have active hydrogen atoms (e.g., carboxylic acids, phenols, amines, etc.) should not be present.

Each diisocyanate may be characterized by its specific organic moiety. For example, those diisocyanates having an aliphatic hydrocarbon moiety are exemplified by tetramethylene diisocyanate; hexamethylene diisocyanate; dodecamethylene diisocyanate; 2,2,4-tri-methyl-hexamethylene-diisocyanate; and the like. Diisocyanates characterized by having aromatic hydrocarbon moieties are exemplified by m-phenylene diisocyanate; p-phenylene diisocyanate; biphenylene diisocyanate; 1,5-naphthalene diisocyanate; and the like. A diisocyanate having an alicyclic hydrocarbon moiety is 1,4-diisocyanate cyclohexane. The diisocyanates containing more than one type of hydrocarbon moiety are exemplified by toluene diisocyanate; durene diisocyanate; 4,4'-diphenylmethane diisocyanate; 3,3'-dimethyl-4,4'-biphenylene diisocyanate; 4,4'-diphenylisopropylidene diisocyanate; p-xylylene diisocyanate; m-xylylene diisocyanate; 4,4'-methylene bis(cyclohexyl isocyanate; 4 - (4 - isocyanatocyclohexyl) phenylisocyanate; 4-isocyanatobenzyl isocyanate; and the like. It is noted that in the foregoing examples the isocyanate groups in each of the diisocyanates may be attached to the same or different hydrocarbon portions of the organic moiety. Further, diisocyanates which have organic moieties containing functional groups may also be used and are exemplified by 4,4'-diphenylsulfone diisocyanate; 4,4'-diphenylether diisocyanate; 3,3'-dimethoxy-4,4'-biphenylene diisocyanate; di(3-isocyanatopropyl) ether; isophorone diisocyanate tetrafluro-p-phenylene diisocyanate; tetrafluro-m-phenylene diisocyanate; 4,4' - diisocyanato - octafluoro-biphenyl and the like. Mixtures of the diisocyanates may be used. Further specific diisocyanates which may be used in the present invention are found in patents, articles, or organic textbooks; a specific example being the paper "Mono and Polyisocyanates" by W. Siefken, Annalen der Chemis 562, 6–136 (1949), which is incorporated herein by reference.

The reaction of hydrogen cyanide with diisocyanates is usually carried out in a solvent in which the heterocyclic polymers are soluble. The dipolar aprotic solvents such as dimethylformamide, dimethylacetamide, dimethyl sulfoxide, hexamethylphosphoramide, N-methylpyrrolidone and the like are preferred. The choice of solvent may be important in certain instances since the molecular weight of the polymer formed may be limited by its solubility in the solvent used in the reaction. Anhydrous solvents are used since water will react with the isocyanate group.

Preferably, the reaction of hydrogen cyanide with diisocyanates is catalyzed with a cyanide ion, derived from an alkali metal cyanide. Suitable alkali metal cyanides are sodium cyanide and potassium cyanide. Since only a very small amount of cyanide ion is necessary to catalyze the polymerization reaction, it is not necessary that the cyanide salt have a high solubility in the reaction mixture.

When the reaction of diisocyanates with hydrogen cyanide, referred to herein as the "one-shot" method, is catalyzed with a cyanide ion, the reaction is normally carried out under ambient and anhydrous conditions; however, the reaction is exothermic so that cooling may be required. The reaction may be carried out at temperatures from 0° to 140° C. but temperatures within the range of 25° to 90° C. are preferred. At higher temperatures, pressure equipment may become necessary due to the volability of hydrogen cyanide (B.P. 25° C.). The reaction may be carried out under a blanket of an inert gas such as nitrogen.

The formation of the heterocyclic rings in the polymer chain may be illustrated by a series of three concerted reactions which are believed to occur when the reaction of hydrogen cyanide with diisocyanates is carried out in the presence of the cyanide ion:

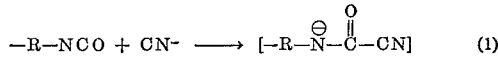

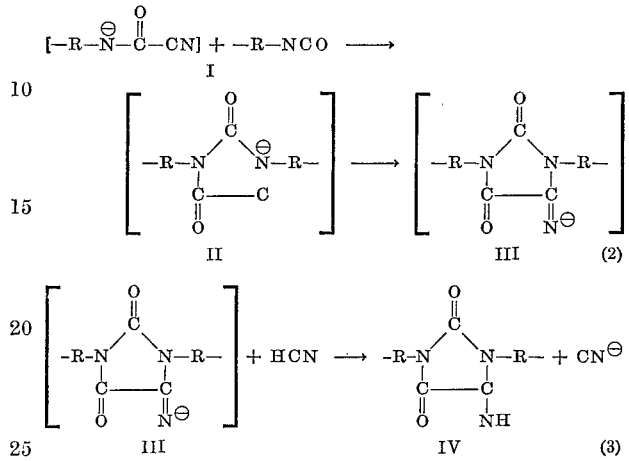

It has been observed generally that ring closure to form the imidazolidine ring is slower when the organic moiety of the diisocyanate is aliphatic. As illustrated in the reaction (2) above, the intermediate cyanoformylurea anion may be more easily cyclized when the organic moiety is an electron withdrawing group such as an aromatic ring. There is evidence that in some instances there is not complete ring closure of all the cyanoformylurea linkages to form the imidazolidine rings and it may be that a cyanoformylurea intermediate (shown below as V) is formed from the anion (II) by the abstraction of hydrogen from hydrogen cyanide or from the cyanoformamide. The ring closure reaction is known to be easily catalyzed with a tertiary amine. This reaction is illustrated by the following:

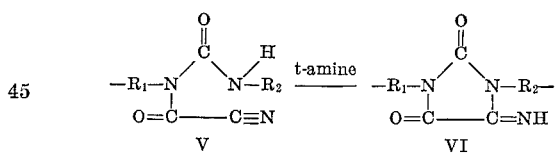

Accordingly, after the polymerization reaction has subsided, usually 5–20 minutes after the addition of all reagents is complete, a tertiary amine is added to the reaction solution. The purpose of the amine is to insure the cyclization of all cyanoformylurea linkages in the polymer chain to 4-imino-1,3-imidazolidine-2,5-dione rings. Exemplary tertiary amines are triethylamine, trimethylamine, N-methyl morpholine, N-methylpiperidine, triethylenediamine, etc.

Bases such as N,N-dialkylanilines, pyridine, picoline, and lutidine may be used but are less effective than the aliphatic tertiary amines. The quantity of t-amine added to the reaction solution may be at least 0.0005 molar equivalents of the isocyanate groups used in the reaction. Preferably, 0.001–0.05 molar equivalents of the isocyanate groups are used.

After adding the t-amine, the reaction solution is stirred from five minutes to ten hours, but preferably ten to sixty minutes. The temperature usually does not rise. The temperature of the reaction solution when the t-amine is added is preferably 20–90° C., and the most preferable temperature range is 20–50° C.

In the reaction of hydrogen cyanide with diisocyanates in the presence of a base catalyst, another reaction may occur, that being the addition at the imino hydrogen atom on the heterocyclic ring to an isocyanate group. This reaction results in cross-linking and the production of The foregoing example illustrates the production of copolymers according to the present invention. While two monomers are illustrated, more than two diisocyanates could be reacted. Furthermore, the copolymers produced may have from 1 to 99 mole percent of one monomer and 99 to 1 mole percent of one or more other monomers.

EXAMPLE 7

A solution of 65 gms. of hydrogen cyanide in 160 gms. of n-methylpyrrolidone was added simultaneously with 403 gms. of hexamethylene diisocyanate to 1000 ml. of N-methylpyrrolidone to which was added 25 ml. of a saturated solution of sodium cyanide in N-methylpyrrolidone. The additions required 12 minutes and the reaction temperature rose to 36° C. Triethylamine (24.2 gms.) in 50 ml. of N-methylpyrrolidone was added to the reaction solution 2 hours after the addition of reagents was completed. After stirring five hours, 63 gms. of dry methanol was added dropwise to the reaction solution to react with unreacted isocyanate groups. The product was precipitated in water, washed with water, and dried. The product was soft and cohesive. It was stirred with acetone in a Waring blender, filtered and dried. The dry white powder represented a yield of 77%. The polymer had an inherent viscosity of 0.29. The polymer was shown to be crystalline by X-ray analysis. TGA analysis showed that the product was stable up to 320° C.

*Analysis.*—Calculated for $(C_9H_{13}N_3O_2)_n$ (percent): C, 55.38; H, 6.71; N, 21.52. Found (percent): C, 55.55; H, 7.10; N, 20.77.

EXAMPLE 8

This is a synthesis of a 50–50 copolymer of diphenylmethane diisocyanate and hexamethylene diisocyanate by their reaction with hydrogen cyanide using the "one-shot" technique. A solution of 100 gms. of N-methylpyrrolidone containing 1 ml. of a saturated sodium cyanide solution in N-methylpyrrolidone was placed in a flask fitted with two dropping funnels and a stirrer. In one funnel was placed a solution of 8.1 gms. of hydrogen cyanide in 90 gms. of N-methylpyrrolidone. In the other dropping funnel was placed a solution of 26.1 gms. of hexamethylene diisocyanate and 37.5 gms. of diphenylmethane diisocyanate in 130 gms. of N-methylpyrrolidone. The contents of the dropping funnels were dropped at a rate such that both were depleted at the same time. The solution in the flask was heated to 50° C. before the addition was started and the temperature increased to 76° C. during the addition which required 30 minutes. Ten minutes before the addition was complete 20 gms. of N-methylpyrrolidone and 5 gms. of triethylamine were added. The temperature jumped from 63° to 76° C. The product was isolated by pouring it into toluene and petroleum ether. The yield of product was 97%, and it had an inherent viscosity of 0.398.

The polymers of the present invention may be converted into films, fibers, foams, molded objects and the like. Films from the polymers of the present invention have been made by casting from solution or by forming under heat and pressure. The polymers are also useful in laminates and for making electrical insulators. The high temperature thermal stability of the polymers produced by the present invention allows them to be used in applications at elevated temperature. The outstanding physical properties and stability at elevated temperature of some polymers made by the present invention demonstrate that these polymers are outstanding engineering plastics.

The nature and objects of the present invention having been completely described and illustrated and the best mode thereof set forth, what I wish to claim as new and useful and secure by Letters Patent is:

I claim:

1. A polymer soluble in dipolar aprotic solvents and having a structure of alternating organic moieties and 1,3-imidazolidine-1,3-diyl rings, said imidazolidine rings being predominantly of the group consisting of:

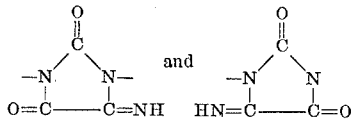

and these rings being randomly distributed in their sequence.

2. A polymer according to claim 1 wherein said organic moieties are selected from the group consisting of aliphatic, alicyclic, aromatic, mixtures of aliphatic, alciyclic and aromatic and functionally substituted derivatives thereof provided the functional group does not react with an isocyanate gorup.

3. A polymer according to claim 1 wherein said organic moieties are all the same.

4. A polymer according to claim 1 wherein at least two different organic moieties are incorporated in the polymer.

5. A polymer according to claim 3 wherein said organic moiety is diphenylmethane.

6. A polymer according to claim 3 wherein said organic moiety is diphenylether.

7. A polymer according to claim 3 wherein said organic moiety is hexamethylene.

8. A polymer according to claim 4 wherein said organic moieties are diphenylmethane and hexamethylene.

9. A polymer according to claim 4 wherein said organic moieties are diphenylether and hexamethylene.

10. A polymer according to claim 4 wherein said organic moieties are diphenylether and diphenyl methane.

References Cited

UNITED STATES PATENTS 3,211,704  10/1965  Gilman et al. _____ 260—77.5

OTHER REFERENCES

Oku et al.: Die Makromolecular Chemie, 78, 1964, pp. 186–193.

DONALD E. CZAJA, Primary Examiner

M. J. WELSH, Assistant Examiner

U.S. Cl. X.R.

161—227; 260—2.5